J. N. Bunnell.
Mouse Trap.
N° 89,551. Patented May 4, 1869.

Witnesses.
Geo. A. Paine 2d
Theo. G. Ellis.

Inventor.
John H. Bunnell

United States Patent Office.

JOHN N. BUNNELL, OF UNIONVILLE, CONNECTICUT.

Letters Patent No. 89,551, dated May 4, 1869.

IMPROVED MOUSE-TRAP.

The Schedule referred to in these Letters Patent and making part of the same.

*To all whom it may concern:*

Be it known that I, JOHN N. BUNNELL, of Unionville, in the county of Hartford, and State Connecticut, have invented certain new and useful Improvements in Mouse-Traps; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

Figure 1:
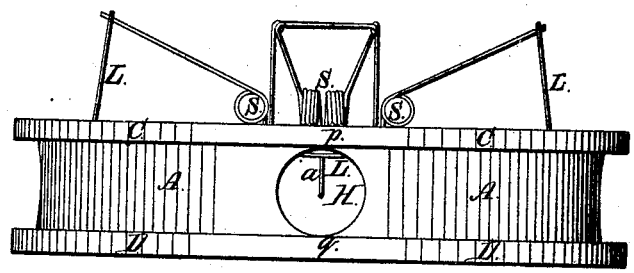
Figure 1 is a front view of an ordinary mouse-trap having my improvement attached.

My invention consists in constructing the body of the trap with two bands or rims around the outside, above and below the entrance-holes, for the purpose hereinafter specified.

A is a wooden block forming the body of the trap.

B B, &c., are the recesses in the body for the bait, and for the animal to enter.

H H, &c., are the entrance-holes, of which the trap shown in the drawings has four.

S S, &c., are the springs for drawing up the loops L to secure the animal when the trap is sprung.

$a$ is the spindle which holds the bait, and by which the trap is sprung.

All the parts above mentioned are constructed in the usual manner, and perform their usual functions.

C and D are two rims, or bands around the outside of the body of the trap, one above and one below the entrance-holes H.

These bands are formed upon the body of the trap by turning the block A of the proper form, and leaving them projecting, instead of making the body of the trap cylindrical as usual.

Figure 2:
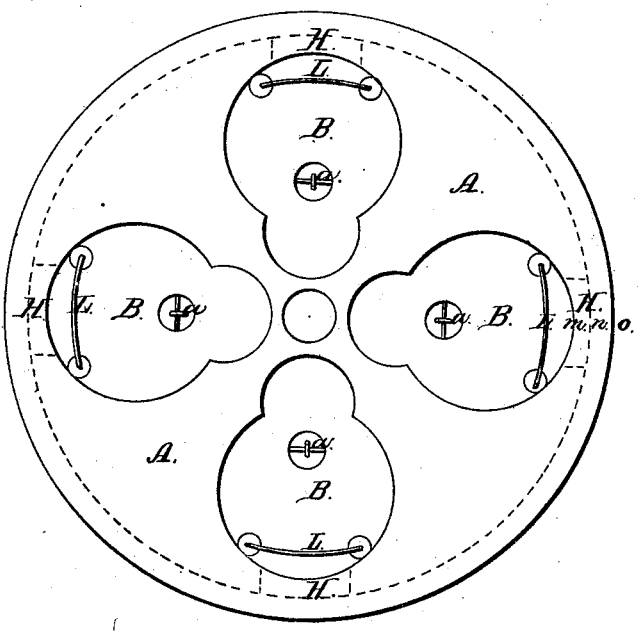
Figure 2 shows a view of the bottom of the trap.

These bands give strength to those portions of the body lying between the recesses B and the outside of the block, at the points shown at $p$ and $q$, fig. 1, and $m$ $n$, fig. 2.

In the ordinary trap, it is necessary to leave the parts at $p$ and $q$ quite thin, in order not to have too great thickness of material around the edges of the apertures H. This weakens the body at the parts $p$ and $q$, especially where they come on the end grain of the wood, so that it frequently splits out and injures the trap.

By putting the bands C and D around the cylindrical surface of the body, the parts $p$ and $q$ are strengthened and made thicker, as shown at $m$ $o$, fig. 2, without increasing the thickness of material around the apertures H, or rendering it more difficult for the animal to enter. On the contrary, by means of my invention, this part may be made much thinner than ordinary, and allow of free access to the interior of the trap.

Claim.

What I claim as my invention, and desire to secure by Letters Patent, is—

Constructing the body of an ordinary mouse-trap, with rings, or bands, around its circumference, substantially as described.

JOHN N. BUNNELL.

Witnesses:
GEO. A. PAINE, 2d,
THEO. G. ELLIS.